United States Patent [19]

Mouri et al.

[11] Patent Number: 5,672,630
[45] Date of Patent: Sep. 30, 1997

[54] PROCESS FOR PRODUCING RECLAIMED RUBBER OR UNVULCANIZED RECLAIMED RUBBER

[75] Inventors: Makoto Mouri; Arimitsu Usuki; Norio Sato, all of Aichi, Japan

[73] Assignee: Kabushiki Kaisha Toyota Chuo Kenkyusho, Aichi-ken, Japan

[21] Appl. No.: 651,057

[22] Filed: May 21, 1996

[30] Foreign Application Priority Data

May 24, 1995 [JP] Japan .................. 7-150905

[51] Int. Cl.$^6$ ........................... C08J 11/04
[52] U.S. Cl. .................. 521/41; 521/110.5; 521/45; 521/45.5; 525/237
[58] Field of Search ............... 521/41, 40.5, 45, 521/45.5; 525/237

[56] References Cited

U.S. PATENT DOCUMENTS

| | | | |
|---|---|---|---|
| 1,508,900 | 9/1924 | Stocks | 521/425 |
| 4,046,834 | 9/1977 | Lee et al. | 260/752 |
| 4,341,667 | 7/1982 | Lal et al. | 521/41 |
| 4,544,675 | 10/1985 | Anderson, Jr. | 521/43 |
| 5,356,939 | 10/1994 | Burrowes et al. | 521/41.5 |
| 5,556,888 | 9/1996 | Koda et al. | 521/44.5 |

FOREIGN PATENT DOCUMENTS

| | | |
|---|---|---|
| 0 393 535 | 10/1990 | European Pat. Off. . |
| 37 19 291 | 12/1988 | Germany . |
| 56-43339 | 4/1981 | Japan . |
| 572923 | 10/1945 | United Kingdom . |

*Primary Examiner*—Paul R. Michl
*Assistant Examiner*—Olga Asinovsky
*Attorney, Agent, or Firm*—Oblon, Spivak, McClelland, Maier & Neustadt, P.C.

[57] ABSTRACT

A process for producing reclaimed rubber has the steps of: mixing waste vulcanized rubber with unvulcanized new rubber and a devulcanizing agent; and kneading the resulting mixture in a heating atmosphere for mastication of the unvulcanized new rubber and simultaneously reclamation of the waste vulcanized rubber. Furthermore, the obtained unvulcanized reclaimed rubber can be vulcanized with a vulcanizing agent.

16 Claims, 2 Drawing Sheets

PROCESS FOR PRODUCING RECLAIMED RUBBER OR UNVULCANIZED RECLAIMED RUBBER

BACKGROUND OF THE INVENTION

1. Field of the Invention

The present invention relates to a process for producing reclaimed rubber or unvulcanized reclaimed rubber from waste vulcanized rubber.

2. Description of the Related Art

Rubber articles such as automotive tires are usually molded from vulcanized rubber, which has sulfur crosslinks (such as —S— and —S—S—) made by vulcanization between molecule chains of unvulcanized rubber. Waste rubber articles are conventionally reclaimed by the process shown in FIG. 2 (flow chart). First, waste vulcanized rubber is crushed, incorporated with a devulcanizing agent, and heated. This step severs the sulfur crosslinks entirely or partly, thereby giving rise to fluid decomposed rubber. Meanwhile, unvulcanized new rubber which comprises an uncrosslinked polymer is separately masticated by milling. Second, the decomposed rubber is thoroughly mixed and kneaded with the unvulcanized new rubber. Third, the resulting mixture is incorporated with a vulcanizing agent and finally vulcanized to obtain vulcanized reclaimed rubber.

The conventional process mentioned above has a disadvantage of requiring entirely separate two steps for converting waste vulcanized rubber into decomposed rubber and masticating unvulcanized new rubber. Therefore, it complicates procedures, consumes much time and work and comes to the increase of production cost of reclaimed rubber.

SUMMARY OF THE INVENTION

It is an object of the present invention to provide an economical and simple process for producing reclaimed rubber or unvulcanized reclaimed rubber without deteriorating the quality of the reclaimed rubber.

To achieve this object, the present inventors performed various experiments. Through these efforts, they discovered that sulfur crosslinks can be effectively severed by applying shearing force to waste vulcanized rubber in the presence of a devulcanizing agent, and eventually conceived that it would be possible to accomplish reclamation (devulcanization) of waste vulcanized rubber and mastication of unvulcanized new rubber simultaneously by mixing and kneading waste vulcanized rubber with unvulcanized new rubber in the presence of a devulcanizing agent, contrary to the common belief. Conventionally, waste vulcanized rubber has to be devulcanized by heating in the presence of a devulcanizing agent to sever sulfur crosslinks. Therefore, it has never been believed that devulcanization is achieved by shearing force that occurs during kneading even in the presence of a devulcanizing agent.

The first aspect of the present invention resides in a process for producing unvulcanized reclaimed rubber, comprising the steps of:

mixing waste vulcanized rubber with unvulcanized new rubber and a devulcanizing agent; and kneading the resulting mixture in a heating atmosphere, thereby performing mastication of the unvulcanized new rubber and reclamation of the waste vulcanized rubber simultaneously to obtain unvulcanized reclaimed rubber.

The second aspect of the present invention resides in a process for producing reclaimed rubber, comprising the steps of:

mixing waste vulcanized rubber with unvulcanized new rubber and a devulcanizing agent;

kneading the resulting mixture in a heating atmosphere to obtain unvulcanized reclaimed rubber; and subsequently vulcanizing the unvulcanized reclaimed rubber with a vulcanizing agent to obtain reclaimed rubber.

According to the first and the second aspects of the present invention, the process for producing reclaimed rubber or unvulcanized reclaimed rubber involves severing sulfur crosslinks in waste vulcanized rubber and simultaneously masticating unvulcanized new rubber. Therefore, the process of the present invention needs a less number of steps and takes a shorter time than the conventional process. This contributes to increased productivity and reduced production cost. Moreover, it can be carried out in a single apparatus, thereby reducing equipment cost as well.

DETAILED DESCRIPTION OF THE INVENTION

Figure 1:
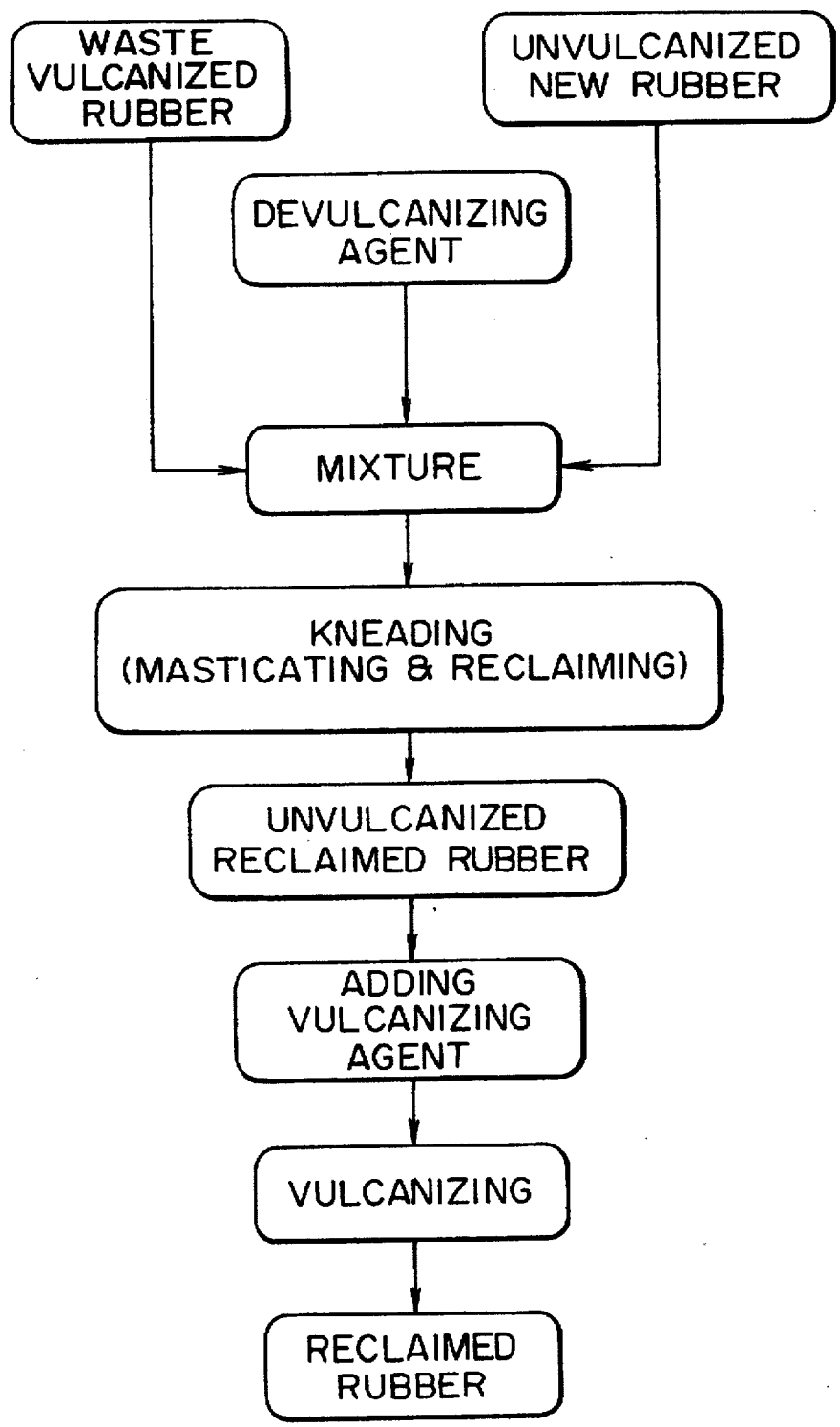
FIG. 1 is a flow chart showing the process of producing reclaimed rubber in Example 1.

The process of the present invention may be applied to waste vulcanized rubber which includes used rubber products and those in crushed form and vulcanized rubber scraps that occur during rubber molding.

The waste vulcanized rubber is a used elastomer or a used rubbery substance having sulfur bonds (such as —S—, —S—S—, and —S—S—S—) between carbon main chains of an organic compound or between polymers of silicone rubber. Examples of the organic compound include butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene, fluoro rubber, and EPDM (ethylene-propylene-diene terpolymer) which are in unvulcanized form.

The unvulcanized new rubber denotes any polymer which is a collective of organic compounds composed of main carbon chains or a collective of silicone rubber molecules, and not yet crosslinked (or vulcanized) with sulfur or sulfur compounds. Examples of such compounds include those listed above.

The waste vulcanized rubber and the unvulcanized new rubber should preferably be of the same kind, so that they are readily miscible with each other, thereby reducing kneading time, as well as yielding reclaimed rubber with uniform and good dynamic properties.

The devulcanizing agent is not specifically restricted so long as it is capable of severing sulfur crosslinks in the waste vulcanized rubber. Any commonly used one will suffice. Typical examples include reclaiming agents such as diaryldisulfide, dixylyldisulfide, phenylhydrazine-ferrous chloride, and thiophenol-butylamine salt. It is not always necessary for the devulcanizing agent to sever all of the sulfur crosslinks in the waste vulcanized rubber. All that is required of the devulcanizing agent is an ability to sever the sulfur crosslinks partly to such an extent that no problems are involved in mixing with the unvulcanized new rubber.

Kneading in the step of masticating and reclaiming may be accomplished by using any means which is capable of applying a certain amount of shearing force to the waste vulcanized rubber and the unvulcanized new rubber so that the former undergoes decomposition and the latter undergoes mastication. Such kneading may be accomplished by a mixing mill or an extruder. A preferable amount of shearing force is 1 to 150 kg/cm$^3$. Shearing force less than 1 kg/cm$^3$ is not enough for mixing required, because decomposition takes a long time. Shearing force exceeding 150 kg/cm$^3$ will sever even the main chains of rubber molecules, deteriorating properties of obtained reclaimed rubber.

The heating atmosphere for masticating and reclaiming should preferably be at 50°–400° C. Heating temperatures less than 50° C. will slow down the rate of decomposition of the waste vulcanized rubber, causing the production of the unvulcanized reclaimed rubber to take a long time. Heating temperatures exceeding 400° C. will sever the main chains of rubber molecules, deteriorating properties of obtained reclaimed rubber.

According to the second aspect of the present invention, the step of masticating and reclaiming is followed by the step of adding a vulcanizing agent and vulcanizing masticated and reclaimed rubber. This vulcanizing step may be accomplished in the same manner as in the conventional technology.

The reclaimed rubber obtained according to the first and the second aspects may be incorporated with optional additives which are commonly used for ordinary rubber in any step of the process.

EXAMPLE 1

The process pertaining to the first and the second aspects of the present invention will be explained with reference to FIG. 1.

As shown in FIG. 1, the process in this example consists of the steps of: mixing waste vulcanized rubber with unvulcanized new rubber and a devulcanizing agent; masticating the resulting mixture in a heating atmosphere, thereby performing mastication of the unvulcanized new rubber and reclamation of the waste vulcanized rubber simultaneously to obtain unvulcanized reclaimed rubber; and subsequently incorporating the unvulcanized reclaimed rubber with a vulcanizing agent to obtain reclaimed rubber. The process will be described below in more detail.

A mixture was prepared from 100 parts per hundred parts of rubber (phr) of unvulcanized EPDM (as unvulcanized new rubber), 30 phr of vulcanized EPDM (as waste vulcanized rubber), 10 phr of reclaiming oil, and 1 phr of diaryldisulfide (as a devulcanizing agent).

The mixture was kneaded by milling with 0.1 mm opening at a temperature of 100° C. for 20 minutes for masticating and reclaiming. In this way unvulcanized reclaimed rubber in which the waste vulcanized rubber and the unvulcanized new rubber are uniformly mixed was obtained.

The unvulcanized reclaimed rubber was incorporated with 2 phr of sulfur (as a vulcanizing agent), 1 phr of Nocceler-NS-P (as a vulcanization accelerator), 3 phr of zinc oxide, and 2 phr of stearic acid. The resulting rubber compound was kneaded for 10 minutes and then vulcanized to obtain reclaimed rubber of this example.

The process in this example permits one to perform mastication of unvulcanized new rubber and reclamation of waste vulcanized rubber (or severing of sulfur crosslinks) simultaneously. The result is improved productivity and reduced production cost due to reduced manufacturing steps, labor, and time.

EXAMPLE 2

In this example, three samples (1 to 3) of reclaimed rubber were prepared according to the process of the present invention, and they were compared with three comparative samples (C1 to C3) of reclaimed rubber prepared according to the conventional process.

Sample 1 was prepared by the process shown in Example 1. (EPDM was used as waste vulcanized rubber and unvulcanized new rubber.) Samples 2 and 3 were prepared from isoprene rubber and butyl rubber, respectively, as waste vulcanized rubber and unvulcanized new rubber. The formulation and process were the same as in Example 1, except that reclaiming oil was not added to samples 2 and 3.

Figure 2:
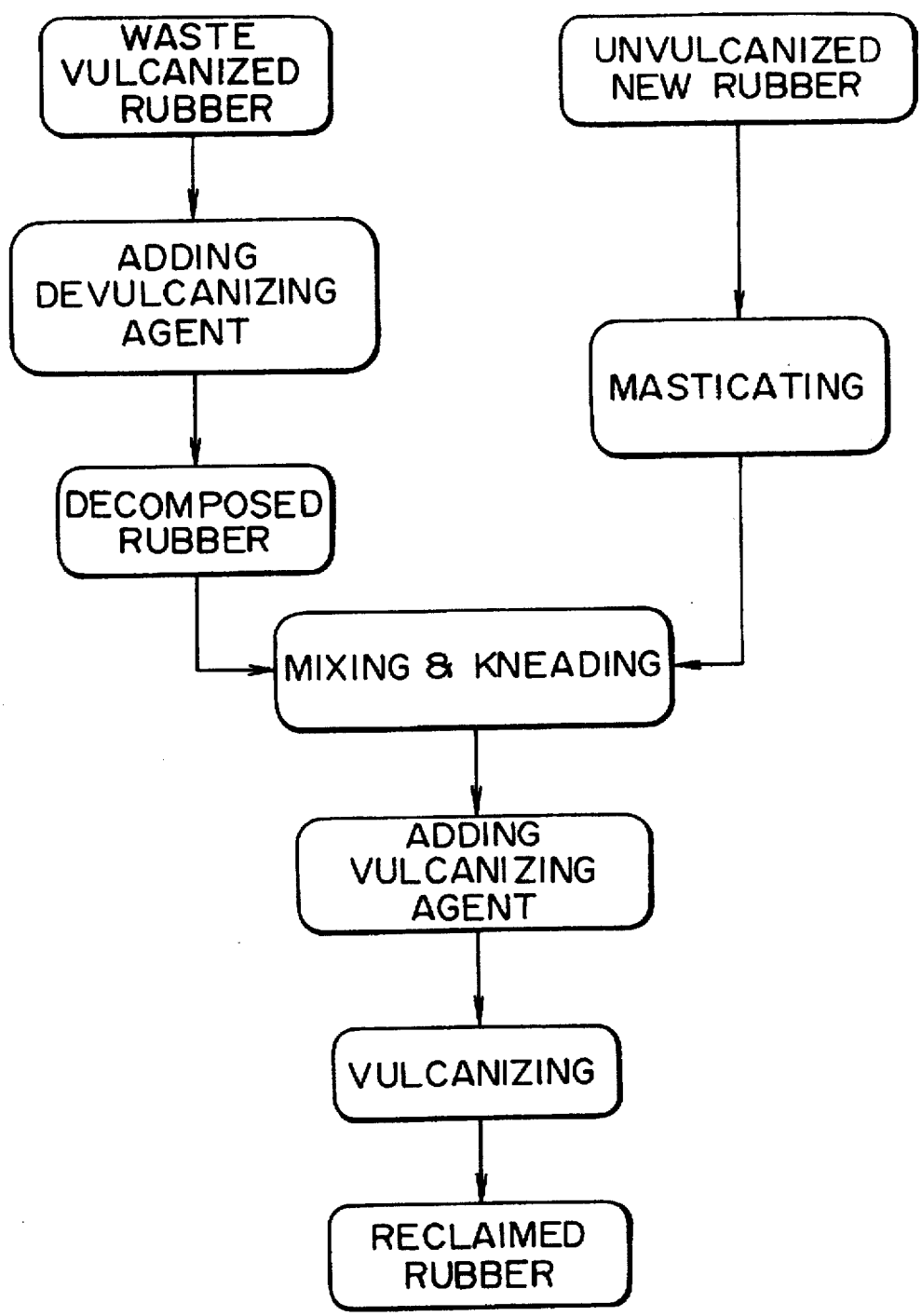
FIG. 2 is a flow chart showing the conventional process of producing reclaimed rubber.

Comparative samples C1 to C3 were prepared according to the process shown in FIG. 2. First, a mixture was prepared from 100 phr of waste vulcanized rubber, 10 phr of reclaiming oil (not added to C2 and C3), and 1 phr of diaryldisulfide (as a devulcanizing agent). The resulting mixture was heated under steam in an autoclave at 200° C. for 5 hours to obtain decomposed rubber. Meanwhile, unvulcanized new rubber was kneaded for mastication for 10 minutes in a mixing mill.

Second, 100 phr of the unvulcanized new rubber (which had undergone mastication) was mixed and kneaded with 30 phr of the decomposed rubber for 10 minutes. Finally, 100 phr of the resulting unvulcanized new rubber was incorporated with 2 phr of sulfur (as a vulcanizing agent), 1 phr of Nocceler-NS-P (as a vulcanization accelerator), 3 phr of zinc oxide, and 2 phr of stearic acid. The resulting mixture was kneaded for 10 minutes and then vulcanized to obtain a sample of reclaimed rubber by the conventional process.

The aforementioned comparative samples C1 to C3 were prepared from EPDM, isoprene rubber, and butyl rubber, respectively, as waste vulcanized rubber and unvulcanized new rubber.

Each sample of the reclaimed rubber was formed into sheet measuring 30 cm×30 cm×5 mm, and dumbbell test specimens (conforming to JIS K6301) were cut out of the sheet. The specimens were tested for tensile strength according to JIS K6301. The results are shown in Table 1.

TABLE 1

| | Tensile strength | Breaking elongation |
|---|---|---|
| Sample 1 | 200 kg/cm$^2$ | 650% |
| Comparative Sample C1 | 190 kg/cm$^2$ | 630% |
| Sample 2 | 180 kg/cm$^2$ | 500% |
| Comparative Sample C2 | 180 kg/cm$^2$ | 480% |
| Sample 3 | 150 kg/cm$^2$ | 600% |
| Comparative Sample C3 | 140 kg/cm$^2$ | 590% |

It is noted that the process of the present invention yields reclaimed rubber comparable to that obtained by the conventional process although it is simpler than the conventional process.

What is claimed is:

1. A process for producing unvulcanized reclaimed rubber, comprising the steps of:

mixing a minor amount of waste vulcanized rubber with a major amount of unvulcanized new rubber, and a chemical devulcanizing agent; and kneading the resulting mixture in a heating atmosphere, thereby performing mastication of the unvulcanized new rubber and reclamation of the waste vulcanized rubber simultaneously to obtain unvulcanized reclaimed rubber.

2. A process for producing reclaimed rubber, comprising the steps of:

mixing a minor amount of waste vulcanized rubber with a major amount of unvulvanized new rubber, and a chemical devulcanizing agent;

kneading the resulting mixture in a heating atmosphere to obtain unvulcanized reclaimed rubber; and subsequently vulcanizing the unvulcanized reclaimed rubber with a vulcanizing agent to obtain reclaimed rubber.

3. The process as defined in claim 1, wherein the heating atmosphere has temperatures ranging from 50° to 400° C.

4. The process as defined in claim 2, wherein the heating atmosphere has temperatures ranging from 50° to 400° C.

5. The process as defined in claim 1, wherein the kneading step shears the waste vulcanized rubber and the unvulcanized new rubber with a shearing force of 1–150 kg/cm$^3$.

6. The process as defined in claim 2, wherein the kneading step shears the waste unvulcanized rubber and the unvulcanized new rubber with a shearing force of 1–150 kg/cm$^3$.

7. The process as defined in claim 2, wherein the heating atmosphere has temperatures ranging from 50° to 400° C. and the kneading step shears the waste unvulcanized rubber and the unvulcanized new rubber with a shearing force of 1–150 kg/cm$^3$.

8. The process as defined in claim 1, wherein the waste vulcanized rubber is at least one member selected from the group consisting of butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene, fluoro rubber, and EPDM (ethylene-propylene-diene terpolymer) in vulcanized form.

9. The process as defined in claim 2, wherein the waste vulcanized rubber is at least one member selected from the group consisting of butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene, fluoro rubber, and EPDM (ethylene-propylene-diene terpolymer) in vulcanized form.

10. The process as defined in claim 7, wherein the waste vulcanized rubber is at least one member selected from the group consisting of butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene, fluoro rubber, and EPDM (ethylene-propylene-diene terpolymer) in vulcanized form.

11. The process as defined in claim 1, wherein the unvulcanized new rubber is at least one member selected from the group consisting of butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene, fluoro rubber, and EPDM (ethylene-propylene-diene terpolymer) in unvulcanized form.

12. The process as defined in claim 2, wherein the unvulcanized new rubber is at least one member selected from the group consisting of butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene, fluoro rubber, and EPDM (ethylene-propylene-diene terpolymer) in unvulcanized form.

13. The process as defined in claim 7, wherein the unvulcanized new rubber is at least one member selected from the group consisting of butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene, fluoro rubber, and EPDM (ethylene-propylene-diene terpolymer) in unvulcanized form.

14. The process as defined in claim 1, wherein the waste vulcanized rubber and the unvulcanized new rubber are identical with each other in original rubber.

15. The process as defined in claim 2, wherein the waste vulcanized rubber and the unvulcanized new rubber are identical with each other in original rubber.

16. The process as defined in claim 7, wherein the waste vulcanized rubber and the unvulcanized new rubber are identical with each other in original rubber.

* * * * *